United States Patent
Kabra et al.

(10) Patent No.: US 10,802,753 B2
(45) Date of Patent: Oct. 13, 2020

(54) DISTRIBUTED COMPUTE ARRAY IN A STORAGE SYSTEM

(71) Applicant: Seagate Technology LLC, Cupertino, CA (US)

(72) Inventors: Nitin Kabra, Pune (IN); Manish Sharma, Bangalore (IN); Rajesh Bhagwat, Pune (IN); Sneha Wagh, Pune (IN); Nilesh Govande, Pune (IN)

(73) Assignee: Seagate Technology LLC, Fremont, CA (US)

( * ) Notice: Subject to any disclaimer, the term of this patent is extended or adjusted under 35 U.S.C. 154(b) by 151 days.

(21) Appl. No.: 15/898,062

(22) Filed: Feb. 15, 2018

(65) Prior Publication Data

US 2019/0250852 A1    Aug. 15, 2019

(51) Int. Cl.
*G06F 3/06* (2006.01)
*G06F 9/00* (2006.01)
*H04L 29/08* (2006.01)

(52) U.S. Cl.
CPC ............ *G06F 3/0659* (2013.01); *G06F 3/067* (2013.01); *G06F 3/0611* (2013.01); *G06F 3/0631* (2013.01); *G06F 9/00* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 6,601,138 B2 * | 7/2003 | Otterness | G06F 3/0613 711/114 |
| 6,839,804 B2 | 1/2005 | Don et al. | |
| 7,577,729 B1 | 8/2009 | Umbehocker et al. | |
| 2001/0044879 A1 * | 11/2001 | Moulton | G06F 3/0617 711/114 |
| 2003/0187853 A1 | 10/2003 | Henslet et al. | |
| 2012/0167108 A1 * | 6/2012 | Bowers | G06F 9/5072 718/103 |
| 2015/0277791 A1 * | 10/2015 | Li | G06F 3/0689 711/114 |
| 2015/0286508 A1 * | 10/2015 | Stowe | G06F 9/505 718/105 |
| 2016/0371104 A1 * | 12/2016 | Zamir | G06F 9/45533 |

* cited by examiner

*Primary Examiner* — Jared I Rutz
*Assistant Examiner* — Marwan Ayash
(74) *Attorney, Agent, or Firm* — Holzer Patel Drennan

(57) ABSTRACT

Implementations disclosed herein include a storage system including a plurality of storage devices, wherein each of the plurality of storage devices includes compute resources, memory resources, and a storage device controller configured to perform application-specific data management operations using the compute resources and the memory resources of the storage device, and a storage system controller configured to distribute a workload across the plurality of storage devices based on a capability of each of the plurality of storage devices during an IDLE state. The capability of each of the plurality of storage devices may be specifications, current availability, and performance history of each of the plurality of storage devices. In some implementations, each of the plurality of storage devices communicate with each other via a peer-to-peer networking communications protocol (e.g., NVme, NVMof, PCIe, Ethernet, etc.).

20 Claims, 4 Drawing Sheets

DISTRIBUTED COMPUTE ARRAY IN A STORAGE SYSTEM

SUMMARY

In one implementation, the disclosed technology provides a storage system including a plurality of storage devices, each of the storage devices including compute resources, memory resources, and a storage device controller configured to perform application-specific data management operations using the compute resources and the memory resources of the storage device, and a storage system controller configured to distribute a workload across the storage devices based on a capability of each of the storage devices during an IDLE state. The capability of each of the storage devices may be specifications, current availability, and performance history of each of the storage devices. In some implementations, each of the storage devices communicates with each other via a peer-to-peer networking communications protocol (e.g., NVme, NVMof, PCIe, Ethernet, etc.).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
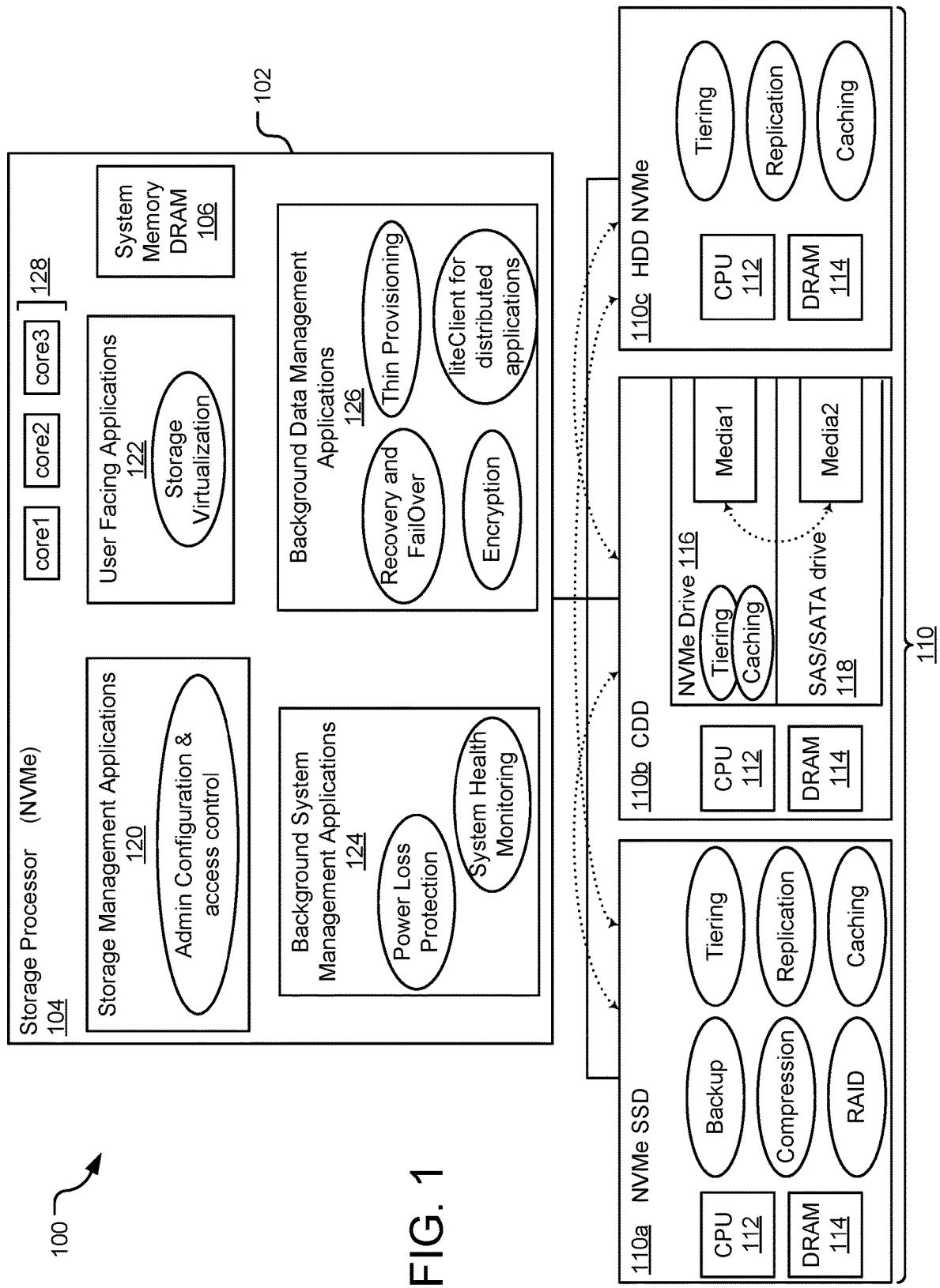
FIG. 1 illustrates a block diagram of an example storage system.

Storage system architecture heavily depends on application controller performance (e.g., compute and memory performance) to serve user data growth while maintaining background data management applications. There are additional application-specific integrated circuits (ASICs) or controllers (e.g., RAID) that may be added in a storage system to minimize dependency on the system controller performance, but such additional components have a high cost. Also, a storage system architecture may not allow offload of any of these application tasks to any IDLE compute resources available located elsewhere in the storage system array. When a storage system demands more performance, it can be achieved by either a higher performance storage controller or high-performance ASICs/HBAs, which can increase the overall storage system cost.

Each storage disk in a storage system has its own disk controller, which may include a processor, and DRAM to manage data within the disk. These disk controllers are local to disks and are not used by an external storage system or application controller to run background data management applications even if the disk controllers are available or in an IDLE state.

The disclosed technology includes a convergence of compute, network, and storage infrastructures to gain performance each infrastructure level to boost overall performance of entire storage system infrastructure with significant cost reduction. Specifically, the disclosed technology includes a distributed in-drive compute infrastructure, where one storage drive communicates with another drive directly and independently. For purposes of this disclosure, the term "distributed" refers to a host in a storage system dividing (and off-loading) a heavy task into smaller sub-tasks and distributing those smaller sub-tasks to IDLE drives in the storage system for further computation. The term "in-drive" refers to storage drives computing complex sub-tasks or problems within the storage drive in response to instructions by the host to compute, rather than functioning as only storage nodes.

The offloading of data transfer between two or more storage drives from a storage system processor to the storage drives provides efficient and cost-effective solutions to ever growing data and a need for higher storage capacity and better storage system controller performance in a storage server system. The drive-to-drive data communication mechanism can also enable new compute paradigms in the storage industry. For example, a current data compute application fetching data from a drive to a storage or host processor to perform a compute task can be offloaded between two drives where an available drive can be used as a compute node for a data compute operation.

The disclosed technology includes a method of dividing larger data management tasks into smaller and simpler tasks and defines a mechanism whereby a drive controller can directly manage the data management aspects related to user data within the limits of a particular drive using its own compute and memory resources. This method enables distributed data management applications to be run on each drive's compute and memory resources without degrading user level experience. These small tasks run as temporary processes in the drive in the form of a batch job or a small run time applet.

In the disclosed technology, a storage system controller distributes an applications workload to disk controllers on storage devices based on the drive capabilities (e.g., specifications, availability, performance history, etc.) of each storage device. An actual workload is then performed by the individual disk controllers freeing up the main storage system controller to perform other tasks. The method manages the distribution by using the interface bandwidth, compute, and memory resources of the storage devices more efficiently at a system level.

FIG. 1 is a block diagram of an example storage system 100 using the disclosed technology. A storage system controller 102 is shown with a processor 104, three cores 128 (e.g., a core 1, a core2, and a core 3), and a system memory DRAM 106. For purposes of this disclosure, the storage system controller 102 may include a processor, a memory, and other components. In some implementations, the storage system controller 102 may be referred to as a host or application controller.

The storage system controller 102 is capable of handling various management applications. In FIG. 1, the storage system controller 102 is capable of handling storage management applications 120 (e.g., administrative configuration and access control), user facing applications 122 (e.g., storage virtualization), background system management applications 124 (e.g., power loss protection, and system health monitoring), and background data management applications 126 (e.g., thin provisioning, recovery and failover, encryption, and a Lite client one each for data management application, which can run in a distributed manner with an in-drive compute operation.

The storage system 100 leverages compute and memory resources within storage drives 110 in an IDLE state or available for compute state to simplify overall storage processor design and minimize cost. When the storage drives 110 are in an IDLE state or available for compute state, their internal compute and memory resources are freed up from IO tasks and hence can be used for data management tasks. Such resources are accessible by the storage system controller 102.

With the disclosed technology, the storage drives 110 become extended and distributed compute and memory resources so that data management applications can offload routine data management tasks to the storage drives 110 from the storage system controller 102 and get notified when such offloaded tasks are completed.

In some implementations, depending upon the amount of spare compute and memory resources available within each drive, different data management applications may be distributed to different storage drives 110 (e.g., a storage drive 110a, a storage drive 110b, and a storage drive 110c) in the storage system 100. In other words, it is not required that every data management application reside on every drive in a distributed manner. For example, the storage drive 110a may provide tiering, replication, caching, compression, RAID applications. The storage drive 110b may provide tiering and caching applications. The storage drive 110c may provide tiering, replication, and caching applications.

In some implementations, the storage drives 110 may include different variants of storage drives 110. For example, the storage drives 110 may include a combination of solid state drives (SSD), solid state hybrid drives (SSHD), hard disk drives (HDD), and composite disk drives (CDD), or any drive where data is stored and accessed. As shown in FIG. 1, for example, the storage drive 110a is an SSD, the storage drive 110b is a CDD, and the storage drive 110c is an HDD. Each of the three storage devices 110 have a CPU 112 and a DRAM 114. The storage drive 110b, a CDD, includes a NVMe Drive 116 and a SAS/SATA drive 118, both of which include drive media (e.g., Media 1 and Media 2). The drive media in the CDD can communicate with each other. In some implementations, when CDDs are used, the CDD drives may be able to hide a complexity of multiple storage protocols within themselves and present a uniform storage protocol to the storage controller.

In the disclosed technology, the applications running in each storage drive may be small applets that run as temporary background processes. Specifically, the storage drives 110 communicate with each other via a common and standard protocol (e.g., PCIe, NVMe, NVMeoF, Ethernet etc.) that allows P2P communication) without creating any custom protocols. In some implementations of the disclosed technology, the storage drives 110 communicate via the same language or protocol, and via peer-to-peer (P2P) communication. The dotted lines with arrows connecting the storage drive 110a, the storage drive 110b, and the storage drive 110c depict P2P communication. Any data movement between the storage drives 110 can use a simple framework adhering to a standard framework defined for the storage interfaces. Referring to FIG. 1, a common protocol NVMe over PCIe bus is shown. In some implementations, other common protocols may be used. In some implementations, each device may control its own standard way of how to communicate with a peer device on a network in the most efficient way.

In some implementations, the storage drives 110 perform under complete command and control from the storage system controller 102 (in some implementations, from a processor in the storage system controller 102) so that storage processor data management applications do not have to be redeveloped and are backward compatible with existing applications.

Figure 2:
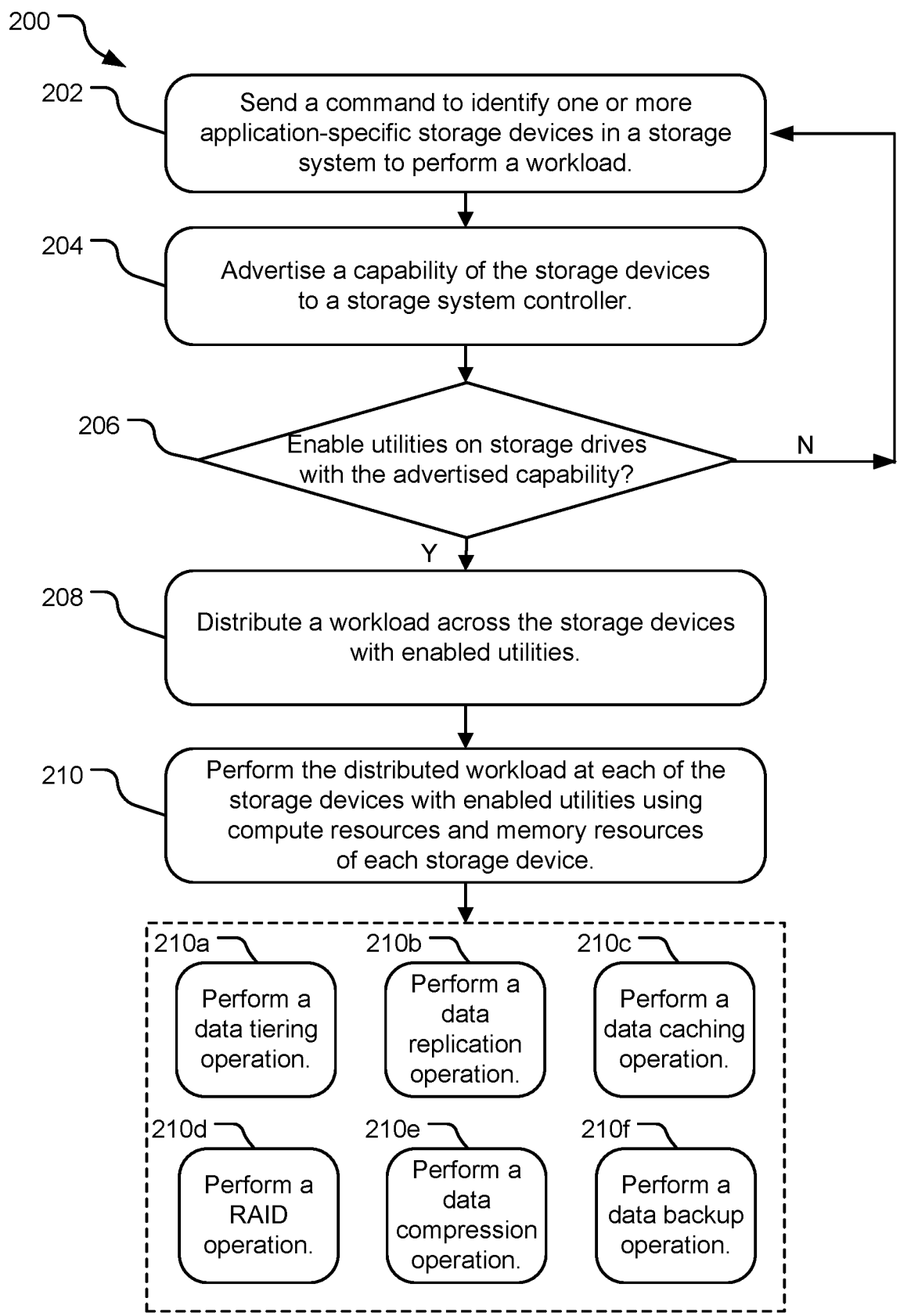
FIG. 2 is a flowchart of example operations for distributing a workload across an array of storage devices.

FIG. 2 is a flowchart of example operations 200 of distributing a workload in a distributed in-drive compute array. In the disclosed technology, a storage system controller can offload certain processing tasks to at least one application-specific storage drive in the in-drive compute array. In some implementations, a set of specific commands (e.g., API) may be written to support the command and control communication between the storage system controller and the storage devices. These level of commands leverage drive-to-drive communication framework to fetch the data from source drive to target drive where compute can be performed.

In one implementation, an operation 202 an external storage processor (or host, or storage system controller) issues an Identify Command to each application-specific storage drive in a storage system to identify which storage drive can perform a workload. The Identify Command solicits information regarding specific capabilities in each application-specific storage devices.

An operation 204 advertises a capability of the one or more application-specific storage devices. A drive-supported capability may be specifications, current availability, or performance history of each of the plurality of storage devices. These capabilities can be identified and measured to determine which application-specific storage device should perform specific tasks. For example, the specifications of a storage device may include determining which utilities/applications (e.g., applets) can be executed within an application-specific storage drive, and which utilities support hardware acceleration. In another example, the current availability of a storage device may include a storage system controller sending a command to check the current running status of an application-specific storage drive.

In another example, the performance history of a storage device may include monitoring performance aspects of an in-drive compute task among multiple drives and determining which drives are a best fit for a particular task. The performance history may include execution time of command and a number of times in-drive compute task are successfully completed. In some implementations, a command in API measures the capability.

An operation 206 makes a decision as to whether an application should be performed on one or more application-specific storage devices responsive to an advertised capability. Specifically, a storage system controller can enable or disable a subset of available utilities of an application-specific storage drive. A drive may implement multiple utilities for a variety of applications. Since drives have limited compute and memory resources, the external storage system processor may not enable all utilities within one drive. The external storage system processor may enable different utilities in different drives, so the compute task can be performed within limited resources in the drive and each compute task can be fairly distributed among multiple drives available in the storage system.

If the operation 206 determines that the utilities of one or more application-specific storage devices should be enabled and are capable of performing an application based on its advertised capability, then an operation 208 distributes a workload across the one or more application-specific storage devices based on the advertised capability of the one or more of the application-specific storage devices. Specifically, a storage system controller can offload certain processing tasks to at least one storage drive by issuing vendor specific or standardized application/class specific commands and providing the address and range of the data sectors.

If the operation 206 determines that utilities of certain application-specific storage devices should not be enabled and are not capable of performing an application based on its capability, then the utilities on those storage drives may be disabled and those storage drives will not perform the current workload. An operation 202 can occur again and reassess those storage drives with disabled utilities for other future tasks.

An operation 208 performs the distributed workload at one or more of the application-specific storage devices with enabled utilities using compute resources and memory resources within each application-specific storage devices. An API/commands may be used to submit the workload in a dedicated queue in drive for performing application-specific tasks in one or more application-specific storage drives. Some of the example arguments for such API/commands may include unique task identifier, task name, file name or LBA ranges, task priority, and application-specific task arguments.

After getting a command from the storage system controller, the processing cores inside a storage drive can decode the command and fetch the required data from its own media or from media of another storage drive to its own local available hardware and memory resources and then process the analytic/compute command over the data.

The tasks and commands can be queued to multiple application-specific queues and the priority of such queues can be set by the storage system controller independently. These application-specific queues can be separate from normal IO queues. The priority designated queues allow management of QoS between a variety of compute tasks with varying priority needs.

Operations 208a-208f are examples of data management operations that may occur as part of the workload. An operation 208a may perform a data tiering operation. An operation 208b may perform a data replication operation. An operation 208c may perform a data caching operation. An operation 208d may perform a RAID operation. An operation 208e may perform a data compression operation. An operation 208f may perform a data backup operation. An API/Command may be used to abort the current running/pending tasks in the one or more application-specific storage drives. For example, a command may include a unique task identifier to abort a task.

After completion of the operation, results will be sent back to the storage system controller. Results may be sent back to the storage processor in one of three ways: 1) the results may be sent with the completion status either in one transmission or in a set of multiple packets; 2) the results may be temporarily stored in an exposed local memory resource visible to the storage system controller and inform the storage system controller about its availability, and the storage system controller can initiate the read transfer later; or 3) the results may be stored in the non-volatile media reserved in special or specific log pages which can then be read by the storage system controller.

The disclosed technology uses the existing infrastructure including storage interface protocols. In some implementations, the application-specific storage drives (e.g., compression, self-archival drives, etc.) are designed which have specialized processing and memory resources to perform more complex compute tasks in hardware. Such custom application-specific storage drives may be installed in one or more storage slots within a storage box to provide such services to other drives in the storage box.

As a result of the disclosed technology, there is a drastic reduction in storage IOs (e.g., data traffic from storage to the storage processor). The storage processor is free to serve more user-facing critical applications processing which boosts overall storage system performance or decreases storage/compute processor utilization. There is a considerable reduction in power consumption as data hops are reduced. There is also a reduction in the storage system controller memory subsystem utilization will improve to hold other expensive programs and data associated with those programs.

An application-specific storage drive can fetch the data from other drives using P2P data transfer technology and perform specific processing on the data and stores back the results accordingly. The application-specific storage drive can serve as an infrastructure component to implement distributed computing techniques, such as 'MapReduce.' An application-specific storage drive can also play a significant role in virtual machines where one physical server hosts many virtual machines and each virtual machine hosts many user-facing applications.

In some implementations, an application-specific storage drive can help run many BIG DATA Analytics operations with low cost hardware. Each offloaded task in the application-specific storage drive can have its own compute priority within the application-specific storage drive for providing flexible and scalable QoS (quality of service) depending upon the user application needs.

Figure 3:
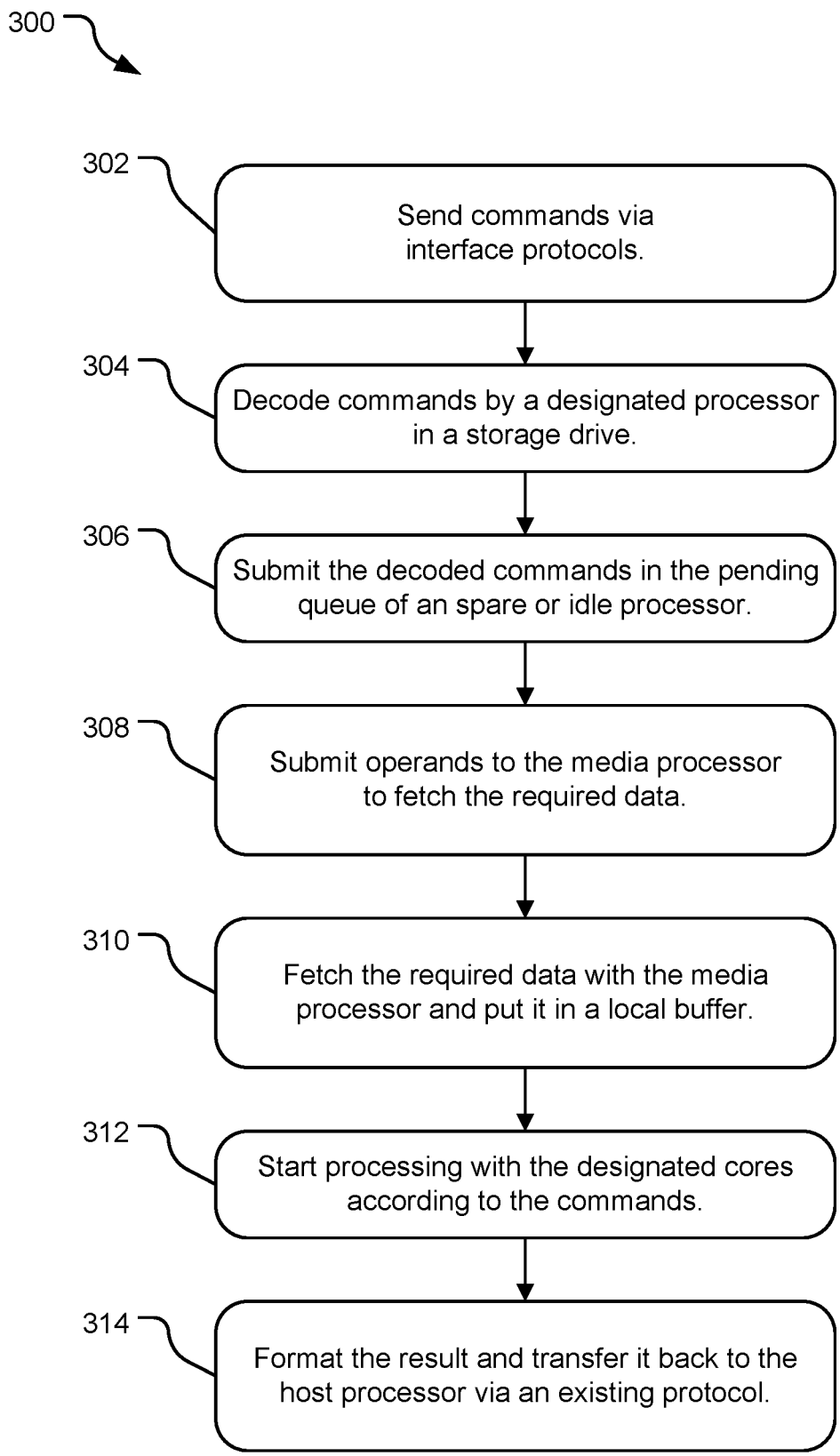
FIG. 3 is a flowchart of example operations for distributing a read-only operations workload across an array of storage devices.

FIG. 3 is a flowchart of example operations 300 of distributing a read-only applications workload in a distributed compute array. Applications which access a storage drive to read the data and perform analytics operations require a storage system controller (or a storage system processor in the storage system controller) to read a required number of sectors from the storage drive to its main memory via a storage interconnect network (e.g., main memory, cache and CPU registers of a storage system processor) to process the data. Then, the data moves to various caches within a storage system processor to internal CPU registers to perform operations.

After performing the operations, the useful result is extracted and the whole data is completely discarded. The storage or compute CPU and memory resources are reserved or locked until the analytics task is done. As a result, there is a definite latency and slow down penalty when a CPU accesses a storage drive. Large data volume is poured in the storage system processor, its main-memory, and caches, etc. to process the data. During IO bursts, the valuable CPU bursts are stalled, which degrades storage system processor performance. There is a significant power consumption penalty to bring the data from the storage media to the storage system processor via the storage interconnect network at every stage within the storage infrastructure.

There is no requirement to bring the storage data from the storage media to the storage system processor in the storage system controller. Thus, application-specific processing can occur inside the storage drive within the limits of the hardware, memory and application-specific capabilities published by the application-specific storage drive. The data to be processed may reside in the same application-specific storage drive or can be fetched directly from other drives by an application-specific storage drive bypassing the storage system processor in the storage system controller.

To minimize the costly read-only accesses to storage devices for big data analytics workloads and to boost storage processor performance without increasing storage system and drive cost, the workload in FIG. 3 is directed to offloading read-only applications (e.g., data analysis, search, and query operations, etc.) involving no original data modifications, from a storage processor to a storage drive.

An operation 302 sends storage system controller commands (e.g., utility, file sector info, and job priority commands, etc.) via existing storage controller interface protocols (e.g., NVMe-PCIe/SATA/SAS etc.). An operation 304 decodes commands by a designated processor in the storage drive. An operation 306 submits the decoded command in the pending queue of a spare or idle processor.

An operation 308 submits the operands (e.g., the address of the data sectors and range to the media processor to fetch the required data). An operation 310 fetches the required data with the media processor and puts the data in the local buffer (e.g. on-chip SRAM and/or DDR etc.). An operation 312 starts processing with the designated core(s) according to the command. An operation 314 formats the result and transfers it back to the storage system processor via an existing protocol.

The application-specific storage drives contain a set of in-built utilities, which the storage system controller is going to offload to the local storage drive. These utilities supported in a drive are discovered by a storage system controller with ring commands specific to a storage system controller interface protocol (e.g., an IDENTIFY_DEVICE command). The application-specific storage drive advertises a list of its capabilities and utilities to the storage system controller. These utilities will be optimized to run on the available cores inside a storage processor subsystem and present in the local media of the application-specific storage drive. Each drive's vendor optimizes these utilities on its drive platform, and an external storage system controller uses a standardized protocol to access these utilities inside a drive. Each application set can standardize access of such utilities in drives from vendors so that a storage system can use drives from multiple vendors.

These utilities can be implemented as overlays which are fetched and loaded on a need-basis or on storage system controller hints. A storage system controller can provide hints to the application-specific storage drive via specific commands about the forthcoming tasks. Those limited number of utilities will be loaded in the cache/I-TCM of a local computing core inside a drive.

When a specific command arrives from the storage system controller, the respective cores start fetching the data from the media with the help from 'media-core' and start processing. When the results are available, the results will be submitted back to the storage system controller using the completion response on the storage system controller interface. The storage system controller can query the status of the analysis jobs running on an application-specific storage drive before sending more tasks to the application-specific storage drive. The application-specific storage drive may implement a special queue with a drive defined queue depth dedicated for running the read-only analytics jobs.

The disclosed technology may be used for search applications. For example, in search applications, a 'grep' command may be issued by a user on a storage system controller terminal. The operating system running on the storage system controller communicates the command using specific commands to the application-specific storage drive where the respective file is located. The operating system also provides the file sector information. The job priority attributes for the task will be attached to the file sector information. When a specific command is received by the storage drive, the command is queued to the local pending queue. When the job is picked for execution, the media processor core is instructed to fetch the utility and/or data from the media. When a sufficient chunk of data is available in the local buffer, the meta-processing cores starts executing the 'grep' utility. The resultant output is stored in the local buffer. Upon the completion of the command or when the buffer crosses the specific threshold, the resultant data and or error message is sent to the storage system controller back as a completion response. In some implementations, the search job may submit a drive which may not have enough resources interims of CPU and memory to perform a job. In such instance, the search job may fetch data from the drive media and transfer that data to a memory resources in adjacent/other drive within same box as directed by the storage system. And the rest of the compute/search job can be performed in another drive. In such mechanisms, the storage system controller hardware and memory resources are completely bypassed.

The disclosed technology may also be used for multimedia streaming. For example, the NIC cards may be placed on PCIe switches and the application-specific storage drives may have a PCIe infrastructure. When a user requests a movie, song, etc., the storage system controller server can establish a link between the NIC and the application-specific storage drive where the multimedia data is stored. The storage system controller instructs the application-specific storage drive to provide the media buffer part by part providing a constant QoS. Or, instead of the application-specific storage drive pushing the data, the NIC can pull the data from the application-specific storage drive. Upon completion, the application-specific storage drive informs the storage system controller about the completion. Similarly, one application-specific storage drive can serve many multimedia streaming requests almost real-time.

The disclosed technology may also be used for data analysis services. For example, there are many applications where data is rarely updated and analyzed frequently. The application running on the storage system controller operating system can offload the data analysis related computing to the application-specific storage drive where the data is present by issuing a specific command. The operating system also provides the file sector information. The job priority attributes for the task will be attached. When the specific command is received by the drive, it queues the command to the local pending queue. When the job is picked for the execution, the media processor core is instructed to fetch the utility and/or data from the media. As soon as a sufficient chunk of data is available in the local buffer, the Meta-processing cores starts executing the 'grep' utility. The resultant output is stored in the local buffer. Upon the completion of the command or when the buffer crosses the specific threshold, the resultant data and or error message is sent to the storage system controller back as a completion response.

The disclosed technology will offload the read-only file processing tasks from a storage processor to a storage drive minimizing data latencies, power, etc. while boosting the overall processing power of the system. The disclosed technology reduces the cost of the storage boxes drastically due to distributed compute resources freely available within an application-specific storage drive. The application-specific storage drives may provide specific software defined services and main storage processor can decide when and what task to be offloaded to a specific application-specific storage drive based on hardware and memory resources available within an application-specific storage drive.

Figure 4:
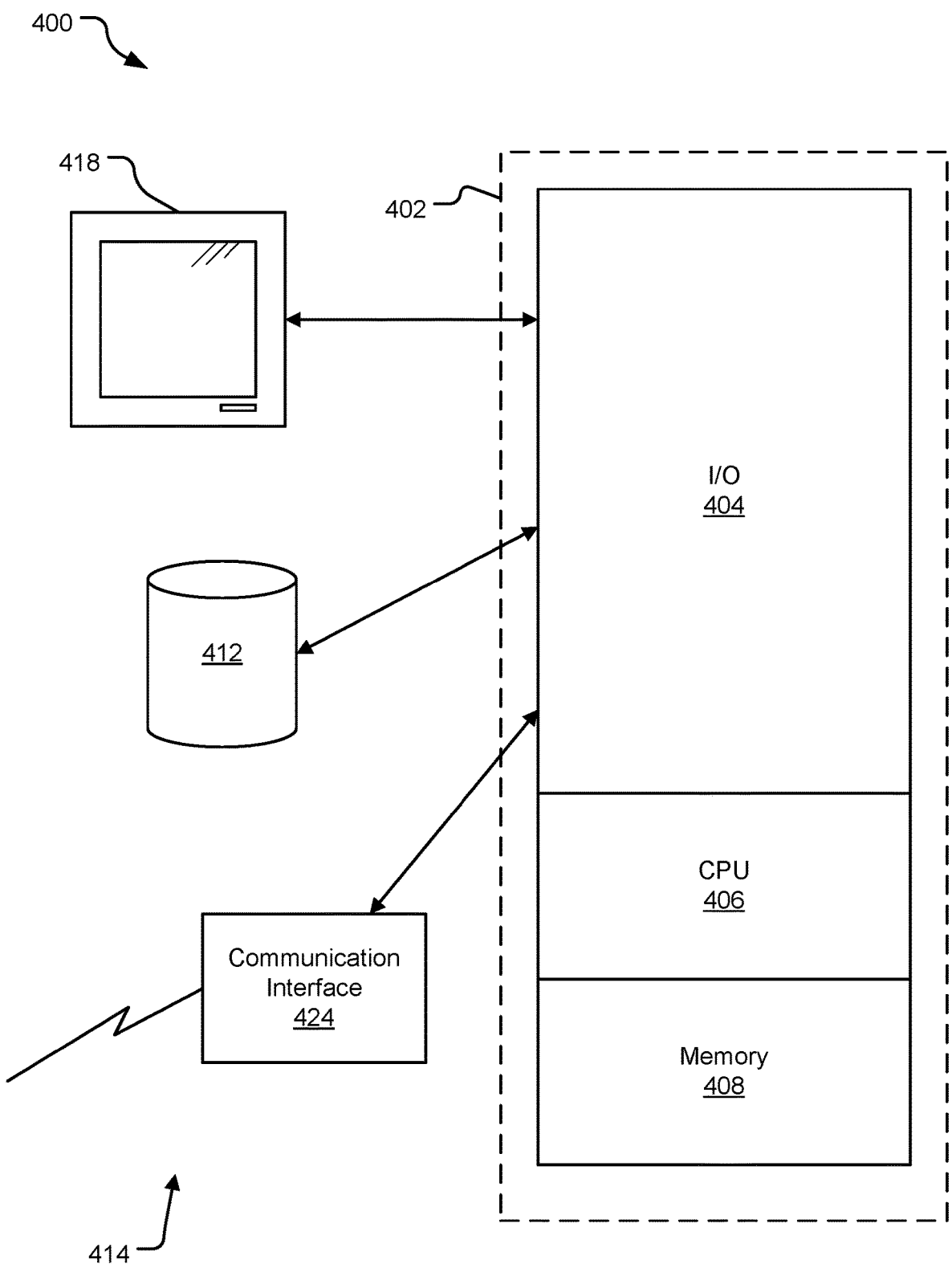
FIG. 4 illustrates an example processing system that may be useful in implementing the described technology.

FIG. 4 illustrates an example processing system 400 that may be useful in implementing the described technology. The processing system 400 is capable of executing a computer program product embodied in a tangible computer-readable storage medium to execute a computer process. Data and program files may be input to the processing system 400, which reads the files and executes the programs therein using one or more processors (e.g., CPUs, GPUs, ASICs). Some of the elements of a processing system 400 are shown in FIG. 4 wherein a processor 402 is shown having an input/output (I/O) section 404, a Central Processing Unit (CPU) 406, and a memory section 408. There may be one or more processors 402, such that the processor 402 of the processing system 400 comprises a single central-processing unit 406, or a plurality of processing units. The processors may be single core or multi-core processors. The processing system 400 may be a conventional computer, a distributed computer, or any other type of computer. The described technology is optionally implemented in software loaded in memory 408, a storage unit 412, and/or communicated via a wired or wireless network link 414 on a carrier signal (e.g., Ethernet, 3G wireless, 5G wireless, LTE (Long Term Evolution)) thereby transforming the processing system 400 in FIG. 4 to a special purpose machine for implementing the described operations. The processing system 400 may be an application specific processing system configured for supporting a distributed compute array in a storage device.

The I/O section 404 may be connected to one or more user-interface devices (e.g., a keyboard, a touch-screen display unit 418, etc.) or a storage unit 412. Computer program products containing mechanisms to effectuate the systems and methods in accordance with the described technology may reside in the memory section 408 or on the storage unit 412 of such a system 400.

A communication interface 424 is capable of connecting the processing system 400 to an enterprise network via the network link 414, through which the computer system can receive instructions and data embodied in a carrier wave. When used in a local area networking (LAN) environment, the processing system 400 is connected (by wired connection or wirelessly) to a local network through the communication interface 424, which is one type of communications device. When used in a wide-area-networking (WAN) environment, the processing system 400 typically includes a modem, a network adapter, or any other type of communications device for establishing communications over the wide area network. In a networked environment, program modules depicted relative to the processing system 400 or portions thereof, may be stored in a remote memory storage device. It is appreciated that the network connections shown are examples of communications devices for and other means of establishing a communications link between the computers may be used.

In an example implementation, a storage system controller, a processor, a disk controller, compute and memory resources, and other modules may be embodied by instructions stored in memory 408 and/or the storage unit 412 and executed by the processor 402. Further, local computing systems, remote data sources and/or services, and other associated logic represent firmware, hardware, and/or software, which may be configured to assist in supporting the storage device. A distributed computer array storage may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 408 and/or the storage unit 412 and executed by the processor 402.

The processing system 400 may be implemented in a device, such as a user device, storage device, IoT device, a desktop, laptop, computing device. The processing system 400 may be a storage device that executes in a user device or external to a user device.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage system comprising:
a plurality of storage drive devices, each including:
a storage device controller comprising:
a storage device processor;
a dynamic random access memory (DRAM) in operative communication with the storage device processor; and
memory resources comprising storage drive media for non-volatile storage of data therein; and
wherein the storage device controller maintains an IO queue for IO commands to be performed by the storage device controller to read data from or write data to the storage drive media of the storage drive and an application-specific queue for application sub-tasks configured to perform application-specific data management operations using the storage device processor and the DRAM of the storage device; and
a storage system controller configured to divide a data management application task into a plurality of data management application sub-tasks and distribute a workload comprising the plurality of data management application sub-tasks across the plurality of storage devices for population of the respective application-specific queue of each storage device based on a drive-supported capability of each of the plurality of storage devices during an idle state of each of the plurality of storage devices when the IO queue of a storage device controller in an idle state does not include any IO commands for execution with respect to the storage media drive of the respective storage media drive.

2. The storage system of claim 1, wherein the capability of each of the plurality of storage devices is at least one of specifications, current availability, and performance history.

3. The storage system of claim 1, wherein one of the plurality of storage devices is configured to perform an application-specific operation for a different storage device.

4. The storage system of claim 1, wherein each of the plurality of storage devices communicate with each other via a peer-to-peer (P2P) networking communications protocol.

5. The storage system of claim 4, wherein the P2P networking communications protocol is at least one of PCIe, SAS, Ethernet, etc.

6. The storage system of claim 1, wherein the workload includes a plurality of storage system data management operations.

7. The storage system of claim 6, wherein the storage system data management operations include at least one of a data tiering operation, a data replication operation, a data caching operation, a RAID operation, a data compression operation, and a data backup operation.

8. An application-specific storage device including a storage drive device, the application-specific storage device comprising:
a storage device controller comprising:
a storage device processor;
a dynamic random access memory (DRAM) in operative communication with the storage device processor; and
memory resources comprising storage drive media for non-volatile storage of data therein;
wherein the storage device controller maintains an IO queue for IO commands to be performed by the storage device controller to read data from or write data to the storage drive media of the storage drive and an application-specific queue for application sub-tasks, and the storage device controller is configured to:
advertise a drive-supported capability of the application-specific storage device to a storage system controller during an idle state of the storage device in which the IO queue does not contain any IO commands;
receive a workload comprising at least one data management application task from the storage system controller based on the advertised drive-supported capability;
add the at least one data management application task to the application-specific queue; and
manage user data via data management operations in the application-specific storage device to perform the workload using the compute resources and the memory resources of the application-specific storage device during the idle state of the application specific storage device.

9. The application-specific storage device of claim 8, wherein the application-specific storage device is configured to communicate with other application-specific storage devices via a peer-to-peer networking communications protocol.

10. The application-specific storage device of claim 8, wherein the capability is at least one of specifications, current availability, and performance history of the application-specific storage device.

11. The application-specific storage device of claim 8, wherein the data management operations run as temporary background processes in applets.

12. The application-specific storage device of claim 8, wherein the application-specific storage device controller is configured to:
notify the storage system controller when the data management operations are completed.

13. The application-specific storage device of claim 8, wherein the application-specific storage device controller is configured to:
receive a command from the storage system controller;
decode the command with processing cores inside the application-specific storage device;
fetch required data from media in the application-specific storage device or from media in another application-specific storage device; and
process the command over the required data.

14. The application-specific storage device of claim 8, wherein priority of the application-specific queues can be determined by the storage system controller independently.

15. A method comprising:
sending a command to identify one or more of a plurality of application-specific storage devices that are storage drive devices in a storage system with a drive-supported capability, each storage drive device comprising a storage device controller maintaining an IO queue for IO commands to be performed by the storage device controller to read data from or write data to storage drive media of the storage drive and an application-specific queue for application sub-tasks configured to perform application-specific data management operations related to the drive-supported capability using a storage device processor and a dynamic random access memory (DRAM) of the storage device;
advertising the drive-supported capability in one or more of the plurality of application-specific storage devices to a storage system controller; and distributing a workload comprising one or more data management application tasks from the storage system controller across the one or more of the plurality of application-specific storage devices to populate respective ones of the application-specific queue at each of the one or more of the plurality of application-specific storage devices based on the drive-supported capability of the one or more of the plurality of application-specific storage devices during an idle state of the one or more of the plurality of application-specific storage devices when the IO queue of a storage device controller in an idle state does not include any IO commands for execution with respect to the storage media drive of the respective storage media drive.

16. The method of claim 15, further comprising:
performing the distributed workload at each of the one or more of the plurality of application-specific storage devices using the storage device processor and the DRAM of each of the one or more of the plurality of application-specific storage devices.

17. The method of claim 15, further comprising:
performing at least one of a data tiering operation, a data replication operation, a data caching operation, a RAID operation, a data compression operation, and a data backup operation.

18. One or more computer-readable storage media encoding computer-executable instructions for executing on a computer system a computer process that distributes a data management workload, the computer process comprising:
sending a command to identify a drive-supported capability in one or more of a plurality of storage devices that are storage drive devices in a storage system, each storage drive device comprising a storage device controller maintaining an IO queue for IO commands to be performed by the storage device controller to read data from or write data to storage drive media of the storage drive and an application-specific queue for application sub-tasks configured to perform application-specific data management operations related to the drive-supported capability using a storage device processor and a dynamic random access memory (DRAM) of the storage device;
advertising the drive-supported capability in one or more of the plurality of storage devices to a storage system controller;
distributing a workload comprising one or more data management application tasks from the storage system controller across the one or more of the plurality of storage devices to populate respective ones of the application-specific queue at each of the one or more of the plurality of application-specific storage devices based on the drive-supported capability of the one or more of the plurality of storage devices during an idle state of the one or more of the plurality of application-specific storage devices when the IO queue of a storage device controller in an idle state does not include any IO commands for execution with respect to the storage media drive of the respective storage media drive; and
performing the workload at each of the one or more of the plurality of storage devices using the storage device processor and the DRAM of each of the one or more of the plurality of storage devices during an idle state of the one or more of the plurality of application-specific storage devices.

19. The one or more computer-readable storage media of claim 18, wherein the plurality of storage devices are application-specific storage drives.

20. The one or more computer-readable storage media of claim 18, further comprising:
performing a peer-to-peer networking communications protocol between the one or more of the plurality of storage devices.

* * * * *